(12) United States Patent
Yamagata (10) Patent No.: US 8,203,556 B2
(45) Date of Patent: Jun. 19, 2012

(54) SYSTEM AND METHOD FOR GENERATING PARTS CATALOG, AND COMPUTER PROGRAM PRODUCT

(75) Inventor: Junichi Yamagata, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 929 days.

(21) Appl. No.: 12/000,767

(22) Filed: Dec. 17, 2007

(65) Prior Publication Data

US 2008/0170070 A1 Jul. 17, 2008

(30) Foreign Application Priority Data

Jan. 16, 2007 (JP) ................................. 2007-007460

(51) Int. Cl.
*G06T 17/00* (2006.01)
*G09G 5/00* (2006.01)

(52) U.S. Cl. ........ 345/420; 345/581; 345/619; 345/629; 345/630

(58) Field of Classification Search .................. 345/420, 345/581, 619, 629, 630
See application file for complete search history.

(56) References Cited

U.S. PATENT DOCUMENTS

| | | | | |
|---|---|---|---|---|
| 5,828,575 A * | 10/1998 | Sakai | ............................. | 700/182 |
| 6,295,513 B1 * | 9/2001 | Thackston | ......................... | 703/1 |
| 6,542,937 B1 * | 4/2003 | Kask et al. | .................... | 719/328 |
| 6,677,940 B1 * | 1/2004 | Tonooka | ........................ | 345/419 |
| 6,968,075 B1 * | 11/2005 | Chang | ............................ | 382/111 |
| 2002/0123812 A1 * | 9/2002 | Jayaram et al. | ................. | 700/98 |
| 2003/0004908 A1 * | 1/2003 | Linthicum et al. | .............. | 706/45 |
| 2003/0097195 A1 * | 5/2003 | Yamrom et al. | ................. | 700/95 |
| 2005/0080502 A1 * | 4/2005 | Chernyak et al. | ............... | 700/97 |
| 2005/0149298 A1 * | 7/2005 | Soman et al. | .................. | 702/189 |
| 2006/0239539 A1 * | 10/2006 | Kochi et al. | .................... | 382/154 |
| 2007/0008621 A1 | 1/2007 | Satoh et al. | | |
| 2007/0198367 A1 | 8/2007 | Yamagata et al. | | |
| 2007/0288504 A1 | 12/2007 | Kagawa et al. | | |
| 2008/0061145 A1 * | 3/2008 | McGushion | ............. | 235/462.13 |

FOREIGN PATENT DOCUMENTS

| | | |
|---|---|---|
| CN | 101025768 A | 8/2007 |
| CN | 101075273 A | 11/2007 |
| EP | 1 742 181 | 1/2007 |
| JP | 2918735 B2 | 4/1999 |
| JP | 2007-109221 A | 4/2007 |

OTHER PUBLICATIONS

Chinese Office Action dated Dec. 4, 2009 for Chinese Patent Application No. 2008100034534.

* cited by examiner

*Primary Examiner* — David T Welch
(74) *Attorney, Agent, or Firm* — Dickstein Shapiro LLP (57) ABSTRACT

A system provides a technology for generating a parts catalog of a desired part by using three-dimensional model data. A parts catalog is generated by combining a part image of a desired part, an assembly image, boundary data of a desired part, and parts configuration data. When three-dimensional model data of a part is not available, an image generating unit displays an image of a predetermined-shaped part in a corresponding position of the assembly image based on the boundary data of the part.

7 Claims, 10 Drawing Sheets

| INPUT-DATA NAME | CONTENTS |
|---|---|
| PART IMAGE | IMAGE OF PART. SCALE RATIO IS DEFINED FOR EACH PART SO THAT WHOLE PART IS DISPLAYED AS LARGE AS POSSIBLE. |
| ASSEMBLY IMAGE | IMAGE GENERATED FOR EACH PART. TARGET PART IS HIGHLIGHTED, AND OTHER PARTS ARE DISPLAYED TRANSLUCENTLY OR IN WIRE FRAME. VIEWED FROM PLURALITY OF DIRECTIONS AS APPROPRIATE. SCALE RATIO IS DEFINED SO THAT ASSEMBLY IMAGE IS DISPLAYED AT SAME SCALE RATIO WHEN VIEWED FROM SAME DIRECTION WITH WHOLE PART IMAGES DISPLAYED AS LARGE AS POSSIBLE. |
| ENLARGED ASSEMBLY IMAGE | IMAGE GENERATED BY ENLARGING ASSEMBLY IMAGE. TARGET PART IS FULLY DISPLAYED AS LARGE AS POSSIBLE WITH MAXIMUM SCALE. WHOLE PART IMAGES ARE DISPLAYED AS LARGE AS POSSIBLE WITH MINIMUM SCALE. PLURALITY OF ASSEMBLY IMAGES WITH DIFFERENT SCALE RATIOS ARE GENERATED AS APPROPRIATE WITH WHOLE PART IMAGES DISPLAYED. |
| BOUNDARY DATA | DATA INDICATIVE OF POSITION OF EACH PART IN ASSEMBLY IMAGE OR ENLARGED ASSEMBLY IMAGE. COMBINATION OF UPPER LEFT COORDINATE AND LOWER RIGHT COORDINATE IN COORDINATE SYSTEM IN WHICH UPPER LEFT CORNER OF IMAGE IS DEFINED AS STARTING POINT (X=0, Y=0) WITH POSITIVE X-AXIS POINTING RIGHT AND POSITIVE Y-AXIS POINTING DOWN. COORDINATES DEFINE RECTANGLE INTO WHICH TARGET PART CAN BE FIT. |
| PART NAME | NAME OF EACH PART |
| PART NUMBER | NUMBER ASSIGNED TO EACH PART. SAME NUMBER IS ASSIGNED TO PARTS IN SAME SHAPE. |
| UNIT NAME | NAME OF UNIT INCLUDING MORE THAN ONE PART. UNIT NAME INDICATES UNIT TO WHICH EACH PART BELONGS. EACH PART GENERALLY BELONGS TO UNIT, SUCH AS PAPER FEEDING UNIT OR PAPER DISCHARGING UNIT. | ns # SYSTEM AND METHOD FOR GENERATING PARTS CATALOG, AND COMPUTER PROGRAM PRODUCT

CROSS-REFERENCE TO RELATED APPLICATIONS

The present application claims priority to and incorporates by reference the entire contents of Japanese priority document 2007-007460 filed in Japan on Jan. 16, 2007.

BACKGROUND OF THE INVENTION

1. Field of the Invention

The present invention relates to a technology for generating a parts catalog.

2. Description of the Related Art

A parts catalog for displaying an image of a part on a screen by using three-dimensional model data is widely used. However, when three-dimensional model data of a part is not available, an image of that part cannot be displayed and corresponding position remains in blank on a screen. Meanwhile, it is difficult to express some parts in three-dimensional model data. For example, string-shaped or band-shaped parts such as cables and harnesses, and small parts such as screws are difficult to express some parts in three-dimensional model data. On the other hand, it is difficult to create three-dimensional model data of some parts. For example, it is difficult to create three-dimensional model data of stickers. Thus, if it is required to display an image of such a part in a three dimensional image, costs of a parts catalog increases.

Japanese Patent Application Laid-open No. H06-176085 discloses a conventional technology for generating a part list of parts of a product. Assume now that a product that is an assembly of a plurality of parts is to be produced in a manufacturing company. Then, the designing section generates a part image of each of the parts of the product, and generates a part list of the parts based on the generated part images. The part images and the part list are then sent from the designing section to the production section. Specifically, generating the part list is performed in a design terminal, a management terminal, and a registration terminal. In the design terminal, an image of a part is generated and stored in an image file, property data of a part is stored in a property data file, and data of a part for retrieval is sent from the design terminal to the management terminal. In the management terminal, a new image number is assigned to a generated image, and the assigned image number is sent from the management terminal to the design terminal. In the registration terminal, when a request for registration is received from the design terminal, the image having the image number is generated as an image data, and the image number and the data of a part for retrieval are registered as character data. The property data is contained in a database together with part data and part configuration data. The part list is generated based on the part data and the part configuration data, so that the part list includes a part name of each of parts of a product and a specification of the parts.

Although the Japanese Patent Application Laid-open No. H06-176085 discloses a system for extracting data on parts from three-dimensional model data and managing the data, a technology for generating a parts catalog of a part is not disclosed. Furthermore, it is difficult to display a part when three-dimensional model data of the part is not available.

SUMMARY OF THE INVENTION

It is an object of the present invention to at least partially solve the problems in the conventional technology.

According to an aspect of the present invention, there is provided a system for generating a parts catalog by using three-dimensional model data of a plurality of parts. The system includes an image generating unit that generates a part image of a part from among the parts and an assembly image in which all part images are assembled based on the three-dimensional model data; a data output unit that calculates boundary data related to a position and a shape of each of the parts in the assembly image based on the three-dimensional model data; a catalog generating unit that generates the parts catalog of a desired part by combining the part image of the desired part, the assembly image, the boundary data of the desired part, and parts configuration data indicative of data for parts management; and a receiving unit that receives boundary data of a data-missing part that is a part whose three-dimensional model data is not available. The image generating unit displays an image of a predetermined-shaped part in a corresponding position of the assembly image based on the boundary data of the data-missing part.

According to another aspect of the present invention, there is provided a method of generating a parts catalog by using three-dimensional model data of a plurality of parts. The method includes generating a part image of a part from among the parts and an assembly image in which all part images are assembled based on the three-dimensional model data; calculating boundary data related to a position and a shape of each of the parts in the assembly image based on the three-dimensional model data; generating the parts catalog of a desired part by combining the part image of the desired part, the assembly image, the boundary data of the desired part, and parts configuration data indicative of data for parts management; receiving boundary data of a data-missing part that is a part whose three-dimensional model data is not available; and displaying an image of a predetermined-shaped part in a corresponding position of the assembly image based on the boundary data of the data-missing part.

According to still another aspect of the present invention, there is provided a computer program product that includes a computer-readable recording medium that stores therein a computer program containing computer-executable commands that cause a computer to execute generating a part image of a part from among the parts and an assembly image in which all part images are assembled based on the three-dimensional model data; calculating boundary data related to a position and a shape of each of the parts in the assembly image based on the three-dimensional model data; generating the parts catalog of a desired part by combining the part image of the desired part, the assembly image, the boundary data of the desired part, and parts configuration data indicative of data for parts management; receiving boundary data of a data-missing part that is a part whose three-dimensional model data is not available; and displaying an image of a predetermined-shaped part in a corresponding position of the assembly image based on the boundary data of the data-missing part.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is an example of contents of a parts catalog.

DETAILED DESCRIPTION OF THE PREFERRED EMBODIMENTS

Exemplary embodiments of the present invention are explained in detail below with reference to the accompanying drawings.

Figure 1:
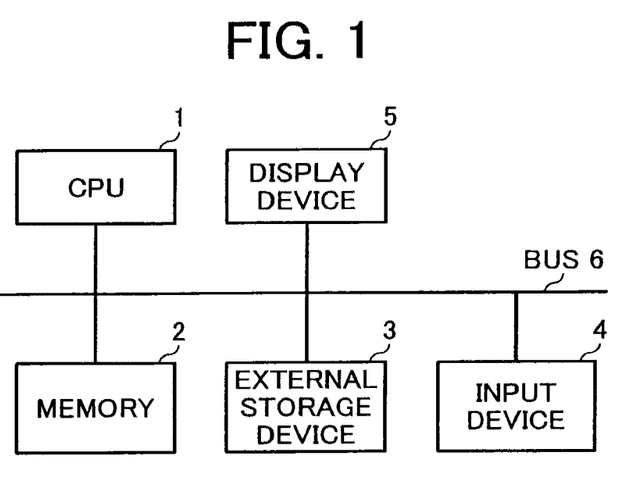
FIG. 1 is a hardware block diagram of a parts-catalog generating system according to an embodiment of the present invention.

FIG. 1 is a hardware block diagram of a parts-catalog generating system according to an embodiment of the present invention. The parts-catalog generating system includes a central processing unit (CPU) 1 that runs a computer program, a memory 2 (e.g., a random access memory (RAM)), an external storage device 3 (e.g., a hard disk drive), an input device 4, and a display device 5. The memory 2 temporarily stores therein a computer program to be executed by the CPU 1 and various data. The external storage device 3 stores therein computer programs and various data. The input device 4 includes a keyboard and a mouse. An operator can input commands and various data including three-dimensional model data of each part by using the input device 4. The display device 5 displays a search screen, a three-dimensional model, or the like. The CPU 1, the memory 2, the external storage device 3, the input device 4, and the display device 5 are connected to one another via a bus 6.

Figure 2:
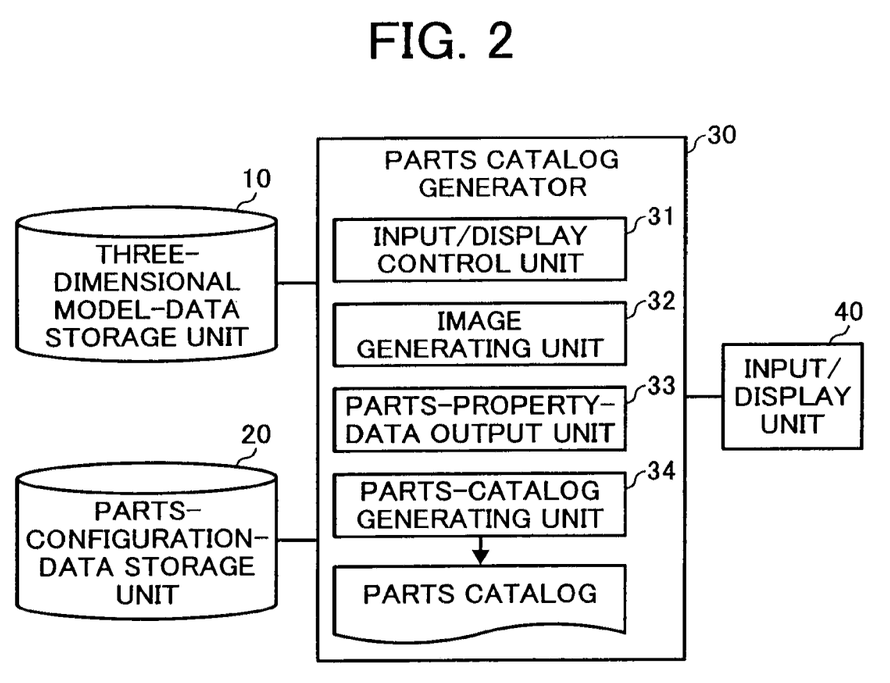
FIG. 2 is a functional block diagram of the parts-catalog generating system.

FIG. 2 is a functional block diagram of the parts-catalog generating system. The parts-catalog generating system includes a three-dimensional model-data storage unit 10, a parts-configuration-data storage unit 20, a parts catalog generator 30, and an input/display unit 40.

Each of the units 10, 20, 30 and 40 is realized by running computer programs corresponding to functions of the parts-catalog generating system by hardware, such as the CPU 1, the memory 2, the input device 4, and the display device 5. Each of the model-data storage unit 10 and the parts-configuration-data storage unit 20 is realized by using the memory 2 and the external storage device 3.

The model-data storage unit 10 stores therein three-dimensional model data that contains data indicative of shape, size, name, assembling state of each part, and the like. The parts-configuration-data storage unit 20 stores therein parts configuration data indicative of configuration of each part. For example, a printer is an assembly of a number of units, such as an exterior unit, a paper feeding unit, or a writing unit. Moreover, each unit is an assembly of a number of parts. The parts-configuration-data storage unit 20 stores therein such data necessary for management of each part. The data contains part name, unit name, part number, size of a part, assembling state of a part, and the like.

The input/display unit 40 displays a search screen or a result of search, and receives a search condition or various commands from an operator.

The parts catalog generator 30 includes an input/display control unit 31, an image generating unit 32, a parts-property-data output unit 33, and a parts-catalog generating unit 34. The input/display control unit 31 controls the input/display unit 40 to display a screen and receives data input from the input/display unit 40. The image generating unit 32 generates a part image of each part and an assembly image in which all part images are assembled based on the three-dimensional model data. A target part is highlighted in the assembly image. The parts-property-data output unit 33 calculates and outputs boundary data related to position and shape, such as height and width, of each part in an assembly image based on the three-dimensional model data. The parts-catalog generating unit 34 generates a parts catalog of a desired part by combining the part image of the desired part, the assembly image, the boundary data of the desired part, and parts configuration data. In the parts-catalog generating system, when the three-dimensional model data of a target part is not available, an image of a predetermined-shaped part (e.g., a rectangular solid) can be displayed in a position where the target part is to be mounted in the assembly image based on the boundary data of the part.

Figure 3:
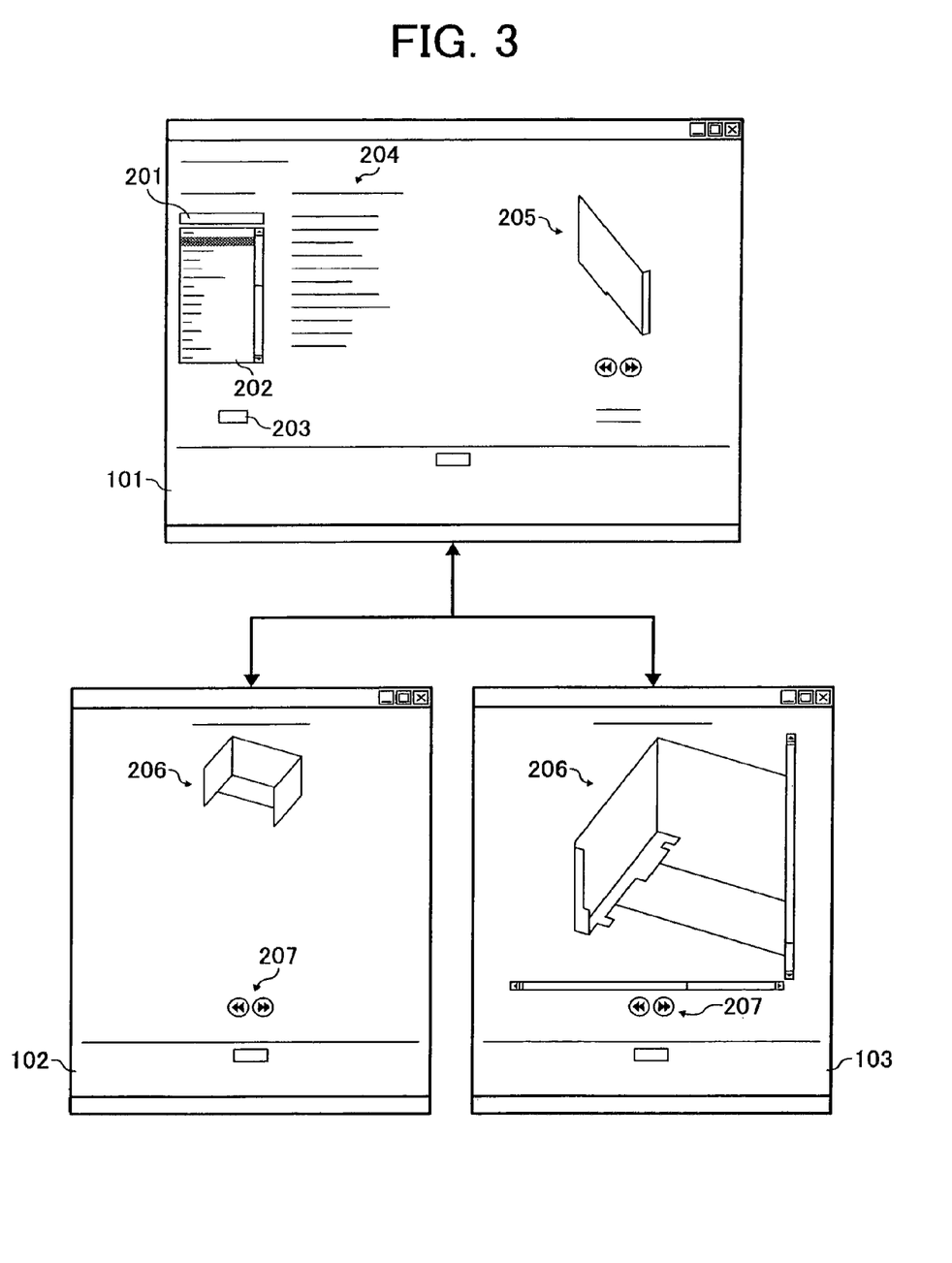
FIG. 3 is an example of a search screen and a result of search to be displayed on an input/display unit shown in FIG. 2.

FIG. 3 is an example of a search screen and a result of search displayed on the input/display unit 40. The input/display control unit 31 refers to the model-data storage unit 10 and the parts-configuration-data storage unit 20 to generate data for displaying a search screen, and controls the input/display unit 40 to display a search screen. When the operator inputs a search condition through the search screen, the input/display control unit 31 receives the search condition and outputs the search condition to the image generating unit 32.

The image generating unit 32 refers to the three-dimensional model data stored in the model-data storage unit 10 based on the received search condition, and then generates a part image or an assembly image of a part. The input/display control unit 31 then controls the input/display unit 40 to display the generated part image or assembly image on a screen. When the input/display unit 40 receives a command to the part image or the assembly image displayed on the screen, the input/display control unit 31 receives the command from the input/display unit 40 and outputs the command to the image generating unit 32. The image generating unit 32 then generates or edits the part image or the assembly image in response to the received command, and the input/display control unit 31 controls the input/display unit 40 to display the generated or edited image on the screen.

Reference number 101 denotes a search screen. Moreover, each of reference numbers 102 and 103 denotes a screen showing an assembly image including a part image of a part corresponding to a search condition. When retrieving a part, the operator inputs a search keyword into a search keyword entry field 201 on the search screen 101. Part names that are often used as a keyword, such as "cover" or "gear", are listed in a list 202, so that the operator can easily select a desired keyword from the list 202. After inputting the keyword, the operator operates a search button 203. As a result, a name of a part corresponding to the keyword is listed in a selected part list 204. When the operator moves a mouse cursor (not shown) onto a name of a part in the selected part list 204, a part image 205 of the part is displayed on the right side of the name. The number in parentheses on the right side of the name indicates the quantity of the same parts (e.g., a screw) that has been retrieved. When there is none of the same parts, then quantity "1" is shown on the right side of the name.

If the operator clicks a name in the selected part list 204, an assembly image 206 of that part is displayed on the screen 102. The assembly image 206 is displayed in such a manner that a part corresponding to the keyword is highlighted by shading the part or drawing an edge of the part in a red line, and other parts are translucently displayed. When the operator rotates a scroll wheel of the mouse forward or backward, the assembly image 206 can be zoomed in or out. Thus, the operator can zoom in the assembly image 206 displayed on the screen 103 as desired. Furthermore, the operator can rotate the assembly image 206 by 90 degrees in the right and left directions by operating arrow buttons 207 arranged on a lower portion of the screens 102 and 103. The operator can place a purchase order for a specific part by clicking the part in the assembly image 206.

Figure 4:
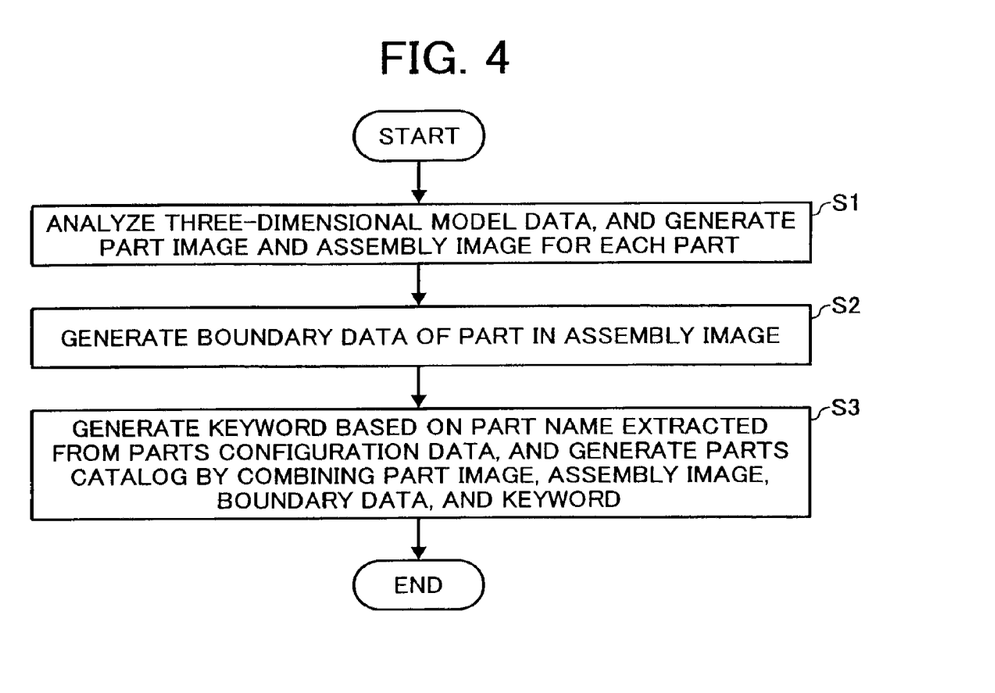
FIG. 4 is a flowchart of the operations performed by the parts-catalog generating system.

FIG. 4 is a flowchart of operation performed by the parts-catalog generating system. The image generating unit 32 analyzes three-dimensional model data of each parts stored in the model-data storage unit 10, and generates, for each part, a part image, an assembly image, and an enlarged assembly image (step S1).

Figure 5:
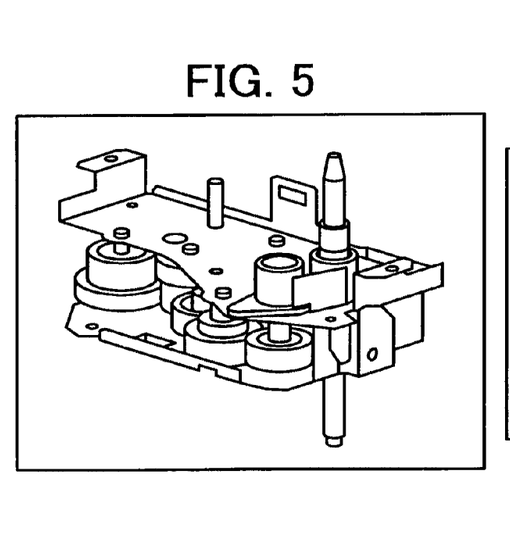
FIGS. 5 to 19 are images of parts according to the embodiment.
Figure 6:
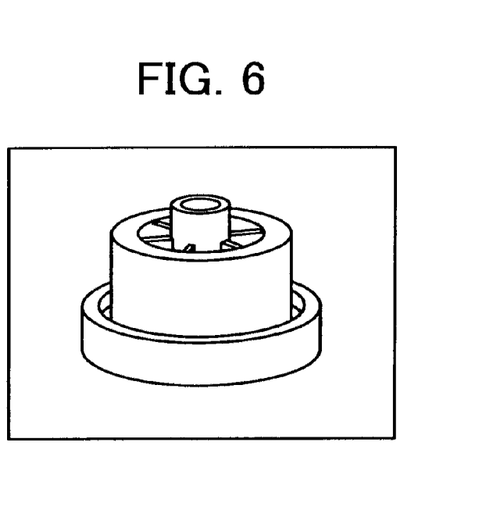
Figure 7:
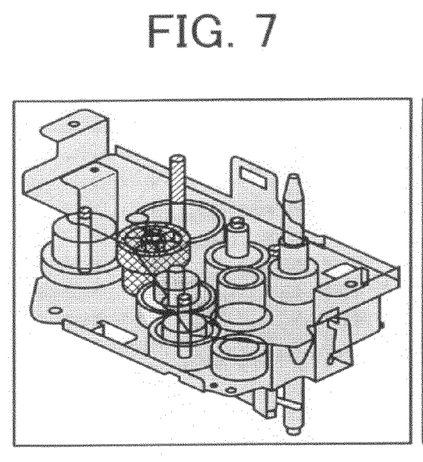

FIG. 5 is an image of whole parts. FIG. 6 is a part image of a part, in which the part is displayed as large as possible. FIG. 7 is an assembly image in which all part images are assembled. A target part is highlighted in the assembly image by shading the part or drawing an edge of the part in a red wire frame, and other parts are translucently displayed, so that the operator can easily recognized a mounting position of the target part.

Figure 8:
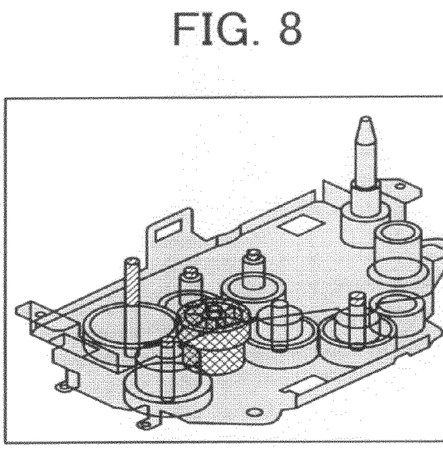
Figure 9:
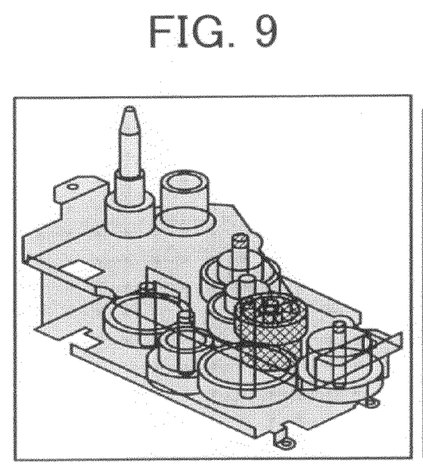
Figure 10:
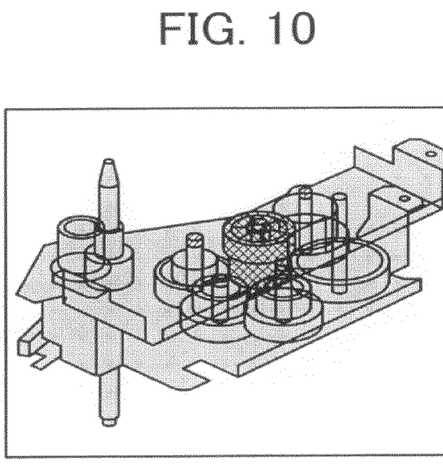

FIGS. 8 to 10 are assembly images shown in FIG. 7 from different angles. Images from different angles are generated in advance, so that a display speed of an image from a different angle can be speeded up. Alternatively, the operator can specify an angle of an image. When the operator specifies an angle of an image, an image from the specified angle is displayed. Because an image from a specified angle is generated in response to a request from an operator, i.e., an image is not generated in advance, a display speed of an image decreases.

Figure 11:
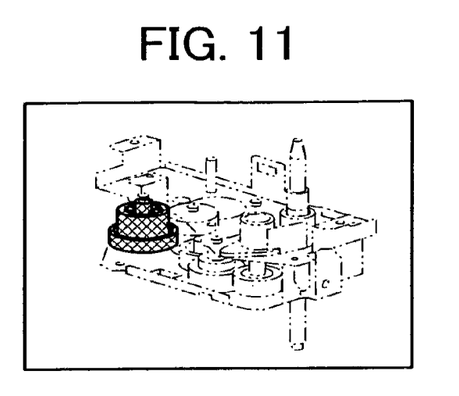
Figure 12:
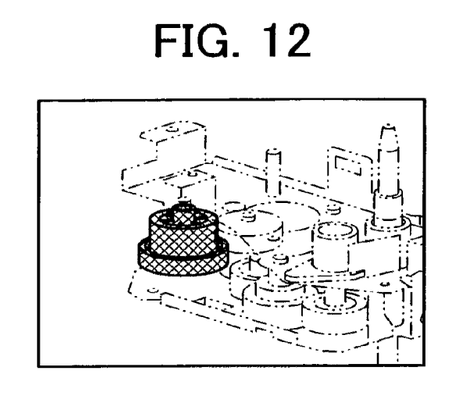
Figure 13:
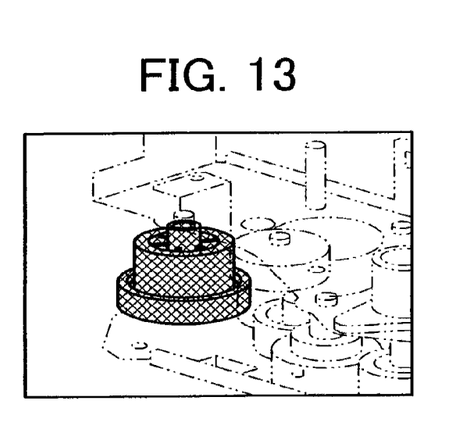
Figure 14:
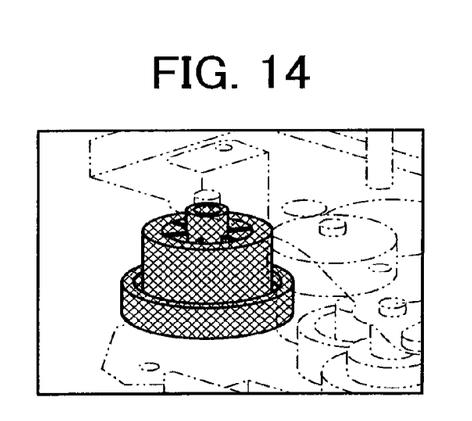
Figure 15:
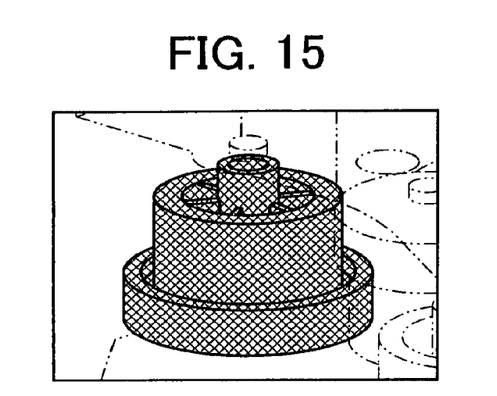

FIG. 11 is an assembly image of the same parts shown in FIG. 7. FIGS. 12 to 15 are enlarged assembly images of the assembly image shown in FIG. 11. When an assembly image is enlarged, a viewpoint is moved from the center of whole part images to the center of an image of a target part. As a result, a viewpoint of the operator hardly changes, reducing any discomfort that may cause to the operator due to changes of the viewpoint.

Figure 16:
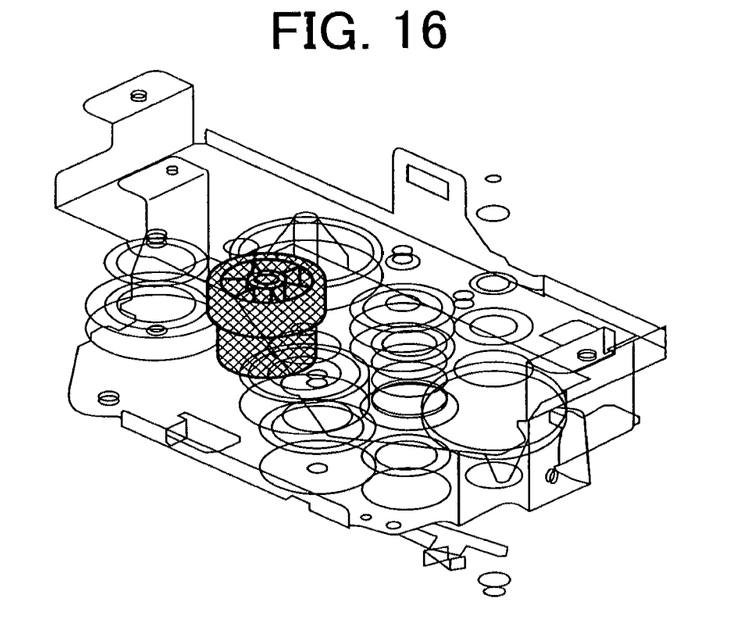
Figure 17:
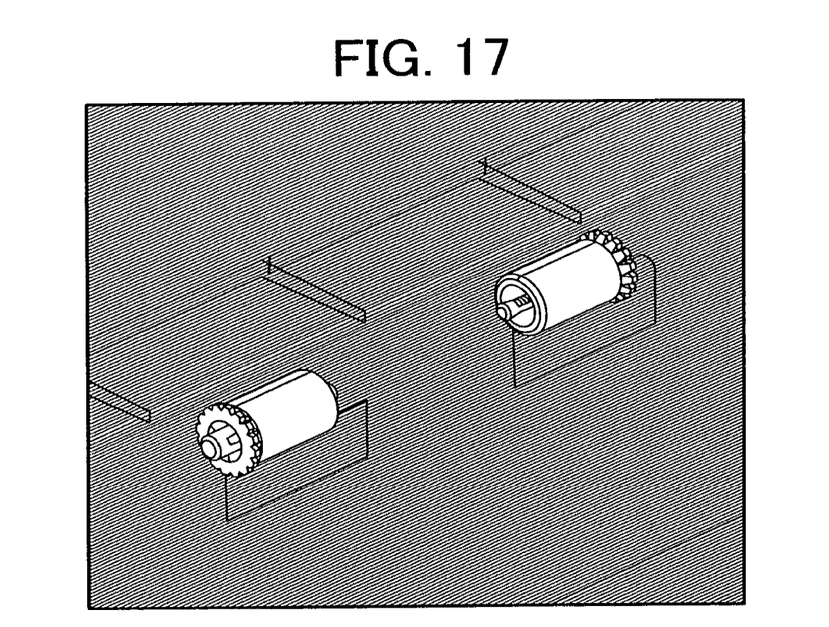

FIG. 16 is an assembly image in which a target part is highlighted by drawing other parts in a wire frame. FIG. 17 is an enlarged assembly image in which two parts having the same configuration are displayed in the same manner. In such a case, the assembly image is enlarged in such a manner that all the similar parts fit into one screen. It is also possible to display one of the parts in an enlarged assembly image.

Figure 18:
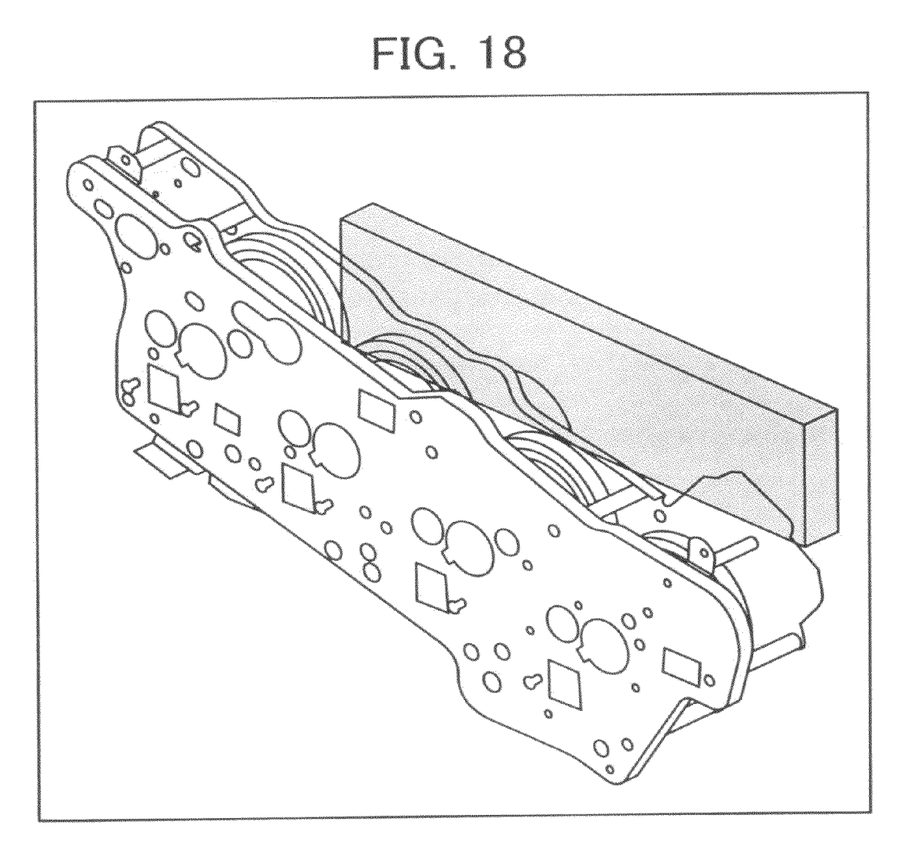

FIG. 18 is an assembly image in which a predetermined-shaped part is displayed, based on the boundary data, in a mounting position of a data-missing part. A data-missing part is a part whose three-dimensional model data is not available. A rectangular solid is displayed in a mounting position of a data-missing part (shown in the upper right side of the assembly image in FIG. 18). The boundary data includes space coordinates to form a rectangular solid, and the space coordinates are defined by (x1, y1, z1)-(x2, y2, z2). Thus, the rectangular solid can be displayed in a mounting position of the part in the assembly image. When an operator inputs the boundary data of a part through the input/display unit 40, the image generating unit 32 displays a predetermined-shaped part, e.g., a rectangular solid, in a mounting position of the part in an assembly image based on the boundary data.

An alternative image can be displayed in a mounting position of a data-missing part. For example, a picture of a part can be displayed as an alternative image in an assembly image, so that an actual shape of the part can be displayed in a corresponding mounting position of a data-missing part.

Figure 19:
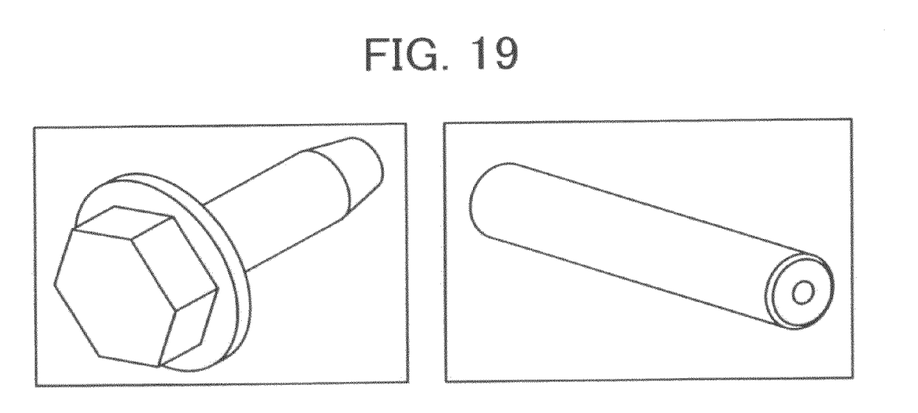

FIG. 19 is an example of predetermined shape data of parts. Instead of displaying a rectangular solid in a mounting position of a data-missing part, a predetermined-shaped part can be displayed in the mounting position of an assembly image based on the shape data. As a result, the operator can visually and easily recognize a displayed image of a part. The operator selects a desired shape from a few shapes in the predetermined shape data through the input/display unit 40, and the image generating unit 32 then displays the selected shape in the image. In this manner, it is possible to display parts with various shapes.

Figure 20A:
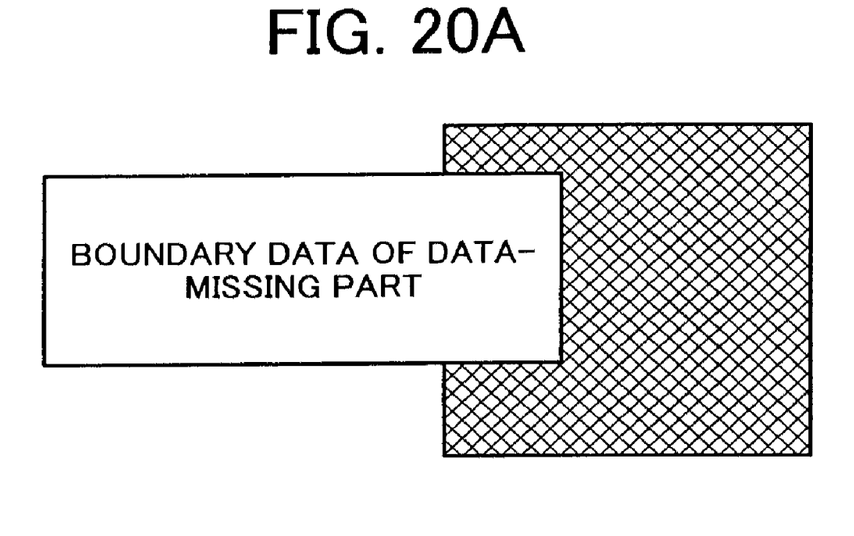
FIGS. 20A and 20B are schematic diagrams for explaining operation for correcting boundary data in a two-dimensional image.
Figure 20B:
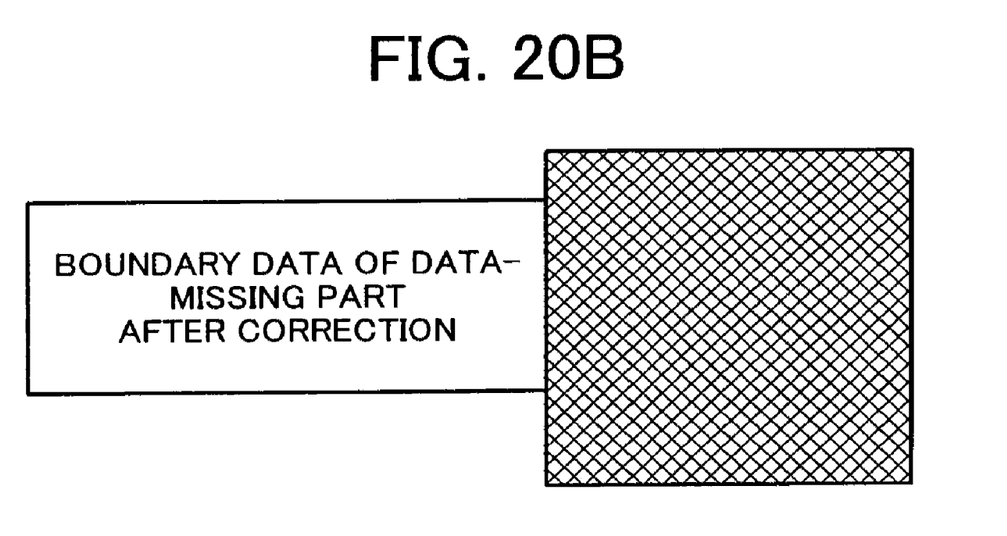

FIGS. 20A and 20B are schematic diagrams for explaining the operations for correcting the boundary data in a two-dimensional image. As shown in FIG. 20A, assume that a rectangle (arranged on the left side) is displayed in a mounting position of a data-missing part based on the boundary data. Some portion of the rectangle is overlapping on a part (arranged on the right side) that is displayed based on the three-dimensional model data. In such an example, the image generating unit 32 automatically performs correction by moving the rectangle to the left as shown in FIG. 20B so that the rectangle and the part do not overlap. If the rectangle overlaps with some other part (not shown) when moved to the left, the width of the rectangle is reduced so that the rectangle does not overlap with the other part.

Returning to FIG. 4, the parts-property-data output unit 33 generates and outputs the boundary data of parts in the assembly image that is generated at step S1 (step S2). The boundary data is used in the input/display unit 40. For example, when the operator specifies a location in the assembly image, the boundary data of entire parts in the assembly image is retrieved, and a part corresponding to the specified location is retrieved and displayed.

Figure 21:
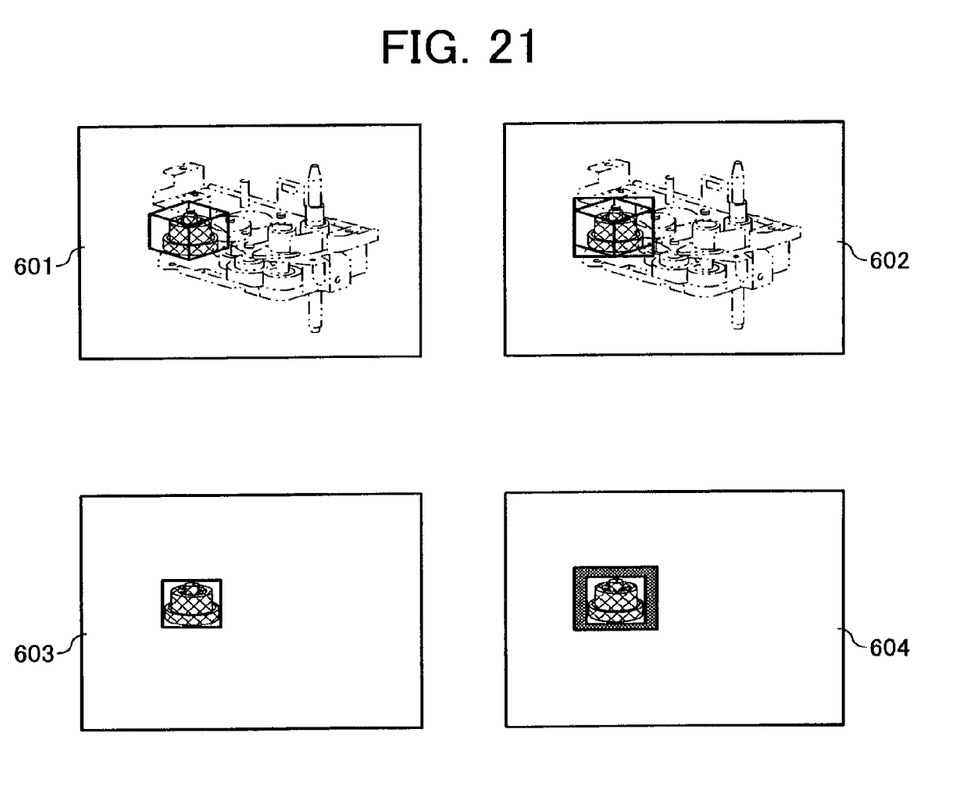
FIG. 21 is a schematic diagram for explaining the operations performed by a parts-property-data output unit shown in FIG. 2 for defining the boundary data.

FIG. 21 is a schematic diagram for explaining the operations performed by the parts-property-data output unit 33 for defining the boundary data. A screen 601 displays a so-called boundary box that is a minimum-sized rectangular solid to fully enclose a specific part in a three dimensional image. A screen 602 displays a minimum-sized rectangle to fully enclose the boundary box in a two dimensional image. When the boundary data of the part is defined by calculation in a two dimensional image, the boundary data is defined as the rectangle in the screen 602. A screen 603 displays a part image of the specific part enclosed by a rectangle. Each dot in the part image is measured to define the boundary data of the part in a two-dimensional image, so that the rectangle is defined by the boundary data. A screen 604 displays the part image of the specific part, and a gap between the boundary data defined in the screen 602 and the boundary data defined in the screen 603 are painted. When the boundary data of the specific part is defined as shown in the screen 603, it is easier to visually recognize the boundary data. The same operation is performed for a data-missing part based on the boundary data of the data-missing part.

Returning to FIG. 4, the parts-catalog generating unit 34 generates a parts catalog of a desired part by combining images (a part image of a desired part and an assembly image) generated by the image generating unit 32, the boundary data of the desired part generated by the parts-property-data output unit 33, and a keyword generated by extracting a part name from the parts configuration data (step S3).

FIG. 22 is an example of contents of the parts catalog. The parts catalog contains items of part image, assembly image, enlarged assembly image, boundary data, part name, part number, and unit name. There can be some other items.

The part image is an image of a part. A different scale ratio is defined for each of the parts so that the whole part is displayed as large as possible.

The assembly image is generated for each of the parts. A target part is highlighted in the assembly image, and other parts are displayed translucently or in a wire frame, so that the target part can be viewed easily.

The assembly image is viewed from a plurality of directions as appropriate. A scale ratio is defined in such a manner that the assembly image is displayed at the same scale ratio when viewed from the same direction, and whole part images assembled are displayed as large as possible.

The enlarged assembly image is generated by enlarging the assembly image of a part. When a maximum scale ratio is applied to a part image, the part image is displayed as large as possible. When a minimum scale ratio is applied, whole part images assembled are displayed as large as possible. Furthermore, a plurality of assembly images with different scale ratios are generated as appropriate with whole part images assembled displayed at any scale ratio.

The boundary data indicates a position of each of parts in the assembly image or the enlarged assembly image. The boundary data includes a combination of an upper left coordinate and a lower right coordinate in a coordinate system in which an upper left corner of an image is defined as a starting point (X=0, Y=0) with positive X-axis pointing right and positive Y-axis pointing down. The coordinates define a rectangle to fully enclose a part.

The part name indicates a name of each of parts and is extracted from the parts configuration data. The part number is assigned to each of parts and is extracted from the parts configuration data. The part number is not necessarily the number, and can be combination of number and code, or the like as appropriate. The same part number is assigned to parts having the same shape. The unit name is extracted from the parts configuration data, and indicates a unit including more than one part and to which each of the parts belongs. Each of the parts generally belongs to any unit, such as a paper feeding unit or a paper discharging unit.

As described above, the image generating unit 32 generates a part image of each part and an assembly image based on the three-dimensional model data. A target part is highlighted in the assembly image. The parts-property-data output unit 33 calculates the boundary data related to the position and the shape, such as height and width, of each part in the assembly image based on the three-dimensional model data. The parts-catalog generating unit 34 generates the parts catalog of a desired part by combining the part image of the desired part, the assembly image, the boundary data of the desired part, and parts configuration data. When the three-dimensional model data of a part is not available, the image generating unit 32 displays the part image of a predetermined-shaped part in a corresponding position of the assembly image based on the boundary data of the part. Thus, it is possible to make it easier to display a predetermined-shaped part in a mounting position of a data-missing part, and the parts catalog can be easily generated.

Furthermore, an alternative image can be displayed in a mounting position of a data-missing part. For example, the parts catalog can be generated by using a picture of a part taken with a digital camera as the part image of the data-missing part instead of a rectangular solid.

Moreover, a part image of a data-missing part can be displayed by using a predetermined shape other than a rectangular solid based on the shape data in addition to the boundary data. The shape data includes typical shapes, such as a cylinder solid or a screw, and any shape can be selected from the shape data. Accordingly, a selected shape can be displayed in a mounting position of a data-missing part. Thus, the parts catalog can be generated by using the selected shape and the boundary data.

Furthermore, areas of a data-missing part and a part displayed by the three-dimensional model data are computed based on the boundary data of the data-missing part and displayed part. When computed areas overlap with each other, the boundary data of the data-missing part is automatically corrected, so that the parts are not overlapped with each other. In this manner, when a part is inappropriately displayed based on the boundary data, the boundary data is automatically corrected, and thereby the part is not overlapped with other part. As a result, parts can be assembled in a natural manner in an assembly image.

The above-described units included in the parts-catalog generating system can be executed by a computer. Alternatively, the model-data storage unit 10, the parts-configuration-data storage unit 20, and the parts catalog generator 30 can be executed in a server for generating the parts catalog, and the input/display unit 40 can be executed by a different computer connected to the server via a network.

The present invention is not limited to the embodiment, and can be achieved by executing computer programs stored in a computer-readable recording medium. Specifically, computer programs corresponding to each of the functions of the parts-catalog generating system can be recorded in a recording medium, so that a computer can load the computer programs recorded in the recording medium to a memory or a storage device of the computer to execute.

Furthermore, computer programs realize functions of the present invention in association with an operating system or other application programs.

Computer programs can be stored in a computer-readable recording medium, such as a disk recording medium (e.g., a magnetic disk or an optical disk), a card type recording medium (e.g., a memory card or an optical card), a semiconductor memory type recording medium (e.g., a read-only memory (ROM) or a nonvolatile memory), or a tape recording medium (e.g., a magnetic tape or a cassette tape). Furthermore, computer programs stored in a storage device can be directly provided from a server via a network. A storage device of a server is also included in a recording medium according to the present invention.

Moreover, costs of the parts-catalog generating system can be reduced, and portability and versatility of the system can be improved by distributing corresponding computer programs.

According to an aspect of the present invention, it is possible to make it easier to display a predetermined-shaped part in a mounting position of a data-missing part, and the parts catalog can be easily generated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for generating a parts catalog, the system comprising:
   a processor; and wherein said system is configured to receive three-dimensional model data for first parts, receive boundary data for a second part which has a shape and whose three-dimensional model data is not available, and store a predetermined shape that is representative of the shape of the second part, but which is simplified and different than the shape of the second part; and wherein said system further comprises an image generating unit that generates an assembly image which shows the first parts assembled together, based on the three-dimensional model data; and a data output unit that calculates boundary data related to a position and a shape of each of the first parts, based on the three-dimensional model data; and wherein the image generating unit displays an image of the predetermined shape in a corresponding position of the assembly image, based on the boundary data for the second part; and wherein said system is configured to generate the parts catalog by combining the assembly image, the image of the predetermined shape, and parts configuration data indicative of data for parts management, such that the parts catalog contains a simplified image of the second part combined with images of the first parts.

2. The system according to claim 1, wherein the predetermined shape is a rectangular solid.

3. The system according to claim 1, wherein the image generating unit displays an alternative image in the corresponding position of the assembly image.

4. The system according to claim 1, further comprising a display device connected to said processor, and wherein the image generating unit displays a shape, selected from a plurality of predetermined shapes by an operator, in the corresponding position.

5. The system according to claim 1, further comprising a memory device, and wherein said processor includes a central processing unit, and wherein said memory device is connected to said central processing unit.

6. A method of generating a parts catalog, the method comprising:

providing three-dimensional model data for first parts, receiving boundary data for a second part which has a shape and whose three-dimensional model data is not available, and storing a predetermined shape that is representative of the shape of the second part, but which is simplified and different than the shape of the second part;

generating an assembly image which shows the first parts assembled together, based on the three-dimensional model data;

calculating boundary data related to a position and a shape of each of the first parts, based on the three-dimensional model data; and displaying an image of the predetermined shape in a corresponding position of the assembly image, based on the boundary data for the second part; and generating the parts catalog by combining the assembly image, the image of the predetermined shape, and parts configuration data indicative of data for parts management, such that the parts catalog contains a simplified image of the second part combined with images of the first parts.

7. A non-transitory computer-readable recording medium that stores therein a computer program containing computer-executable commands for generating a parts catalog that cause a computer to execute:

providing three-dimensional model data for first parts, receiving boundary data for a second part which has a shape and whose three-dimensional model data is not available, and storing a predetermined shape that is representative of the shape of the second part, but which is simplified and different than the shape of the second part;

generating an assembly image which shows the first parts assembled together, based on the three-dimensional model data;

calculating boundary data related to a position and a shape of each of the first parts, based on the three-dimensional model data; and displaying an image of the predetermined shape in a corresponding position of the assembly image, based on the boundary data for the second part; and generating the parts catalog by combining the assembly image, the image of the predetermined shape, and parts configuration data indicative of data for parts management, such that the parts catalog contains a simplified image of the second part combined with images of the first parts.

* * * * *